US012775724B2

(12) United States Patent
Jaouen

(10) Patent No.: US 12,775,724 B2
(45) Date of Patent: Oct. 27, 2026

(54) IDENTIFICATION OF AN APPLICATION

(71) Applicant: STMicroelectronics International N.V., Geneva (CH)

(72) Inventor: Michel Jaouen, Yvre l'Eveque (FR)

(73) Assignee: STMicroelectronics International N.V., Geneva (CH)

( * ) Notice: Subject to any disclaimer, the term of this patent is extended or adjusted under 35 U.S.C. 154(b) by 160 days.

(21) Appl. No.: 18/610,440

(22) Filed: Mar. 20, 2024

(65) Prior Publication Data

US 2024/0320352 A1 Sep. 26, 2024

(30) Foreign Application Priority Data

Mar. 23, 2023 (FR) ....................................... 2302751

(51) Int. Cl.

*G06F 21/62* (2013.01)
*G06F 7/58* (2006.01)
*G06F 21/44* (2013.01)
*G06F 21/57* (2013.01)
*G06F 21/60* (2013.01)

(52) U.S. Cl.

CPC .............. *G06F 21/62* (2013.01); *G06F 7/582* (2013.01); *G06F 21/44* (2013.01); *G06F 21/575* (2013.01); *G06F 21/602* (2013.01)

(58) Field of Classification Search

CPC .......... G06F 21/62; G06F 7/582; G06F 21/44; G06F 21/575; G06F 21/602
See application file for complete search history.

(56) References Cited

U.S. PATENT DOCUMENTS

2007/0180249 A1* 8/2007 Hatakeyama ........... G06F 21/10 713/176
2012/0090021 A1* 4/2012 Luh ......................... G06F 9/468 726/17
2013/0061314 A1* 3/2013 De Atley ................ G06F 21/53 726/17
2016/0218763 A1* 7/2016 Trau ...................... H04W 8/265
2021/0064546 A1 3/2021 Zmudzinski et al.

OTHER PUBLICATIONS

INPI Search Report and Written Opinion for priority application, FR Appl. 2302751, report dated Oct. 31, 2023, 9 pgs.

* cited by examiner

*Primary Examiner* — Ayoub Alata
(74) *Attorney, Agent, or Firm* — Crowe & Dunlevy LLC

(57) ABSTRACT

A system includes at least one first application and a shared software platform. The shared software platform identifies each first application a first random number. The first random number is stored in encrypted fashion in an executable code of the first application. The first application is further identified by a second number which is representative of the first random number. The second number is stored in a first portion of a memory only accessible to the shared software platform.

13 Claims, 4 Drawing Sheets

IDENTIFICATION OF AN APPLICATION

PRIORITY CLAIM

This application claims the priority benefit of French Application for Patent No. 2302751, filed on Mar. 23, 2023, the content of which is hereby incorporated by reference in its entirety to the maximum extent allowable by law.

TECHNICAL FIELD

The present disclosure generally concerns electronic systems and devices and, in particular, the security of such electronic systems and devices. The present description more particularly relates to the protection of data, or digital assets, used by an application implemented by an electronic systems or device.

BACKGROUND

It is current nowadays to use electronic systems and devices which are configured to execute a plurality of different functionalities, themselves implemented by software applications.

It would be desirable to be able to improve, at least partly, certain aspects of software systems and architectures. More particularly, it would be desirable to be able to improve, at least partly, certain aspects of the securitization of software applications.

There exists a need for electronic systems and devices configured to implement a plurality of software applications in secure fashion.

A need also exists to overcome all or part of the disadvantages of known electronic systems configured to implement one or a plurality of software applications.

A need further exists to overcome all or part of the disadvantages of methods for storing, and recovering, digital assets of a software application.

SUMMARY

An embodiment provides an electronic system where applications are reliably identified by a shared software platform.

An embodiment provides a method for booting such a system.

An embodiment provides methods for storing and recovering digital assets into and from a system memory.

An embodiment provides a system comprising at least one first application and a shared software platform, wherein each application is identified by said software platform by a first random number, said first random number being stored in encrypted fashion in an executable code of said first application, and a second number representative of said first random number being stored in a first portion of a memory only accessible to said platform.

According to an embodiment, said second number representative of said first random number is generated by said software platform.

According to an embodiment, said first random number is generated by a first manufacturer of original equipment of said first application.

According to an embodiment, said first random number is modified during an update of said first application.

According to an embodiment, said executable code of said first application is stored in a second portion of a memory which is not accessible to a second manufacturer of original equipment of a second application implemented by said platform.

According to an embodiment, the system is a secure operating system embedded in a secure element.

Another embodiment provides a method of booting a previously-described system comprising the following successive steps: sending, by said first application, of said executable code, encrypted, to said platform; extracting, by said platform, of said first random number; generating, by said platform, of said second number; and storing of said second number.

According to an embodiment, the method further comprises the following successive steps: decrypting, by said platform, of said encrypted executable code with a first decryption key; and storing of said decrypted executable code.

According to an embodiment, said decrypted executable code is stored in said second memory portion.

According to an embodiment, said key is not known by said second original equipment manufacturer.

Another embodiment provides a method for storing least one first digital asset of said first application of the previously-described system, wherein said platform stores said at least one digital asset and associates it with said second number.

According to an embodiment, the platform uses said second number to sign and/or encrypt said at least one first digital asset.

According to an embodiment, said at least one first digital asset is stored in a third portion of a memory.

Another embodiment provides a method of recovering of at least one second digital asset associated with a third number by a third application identified by a fourth random number, implemented by the previously-described system, wherein said platform verifies the matching of said third and fourth numbers.

According to an embodiment, if the matching is verified, said at least one second asset is transmitted to said third application by said platform.

According to an embodiment, if the matching is not verified, an error is transmitted to said third application by said platform.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

The embodiments described hereafter relate to the securitization of software applications, and more particularly to the securitization of digital assets of such software applications. It is more precisely aimed at avoiding for a software application to access digital assets which are not intended for it, such as digital assets of another software application, or digital assets of an old version of a same software application. The embodiments described hereafter particularly enable to overcome an attack by substitution of applications, where a pirate application takes the place of an already-installed application, pretending to be the latter during an update, to have access to digital assets of the application.

The embodiments described hereafter concern, more particularly, a system comprising a software platform configured to implement one or a plurality of software applications. Each software application is identified by the platform via a random number, that it stores in encrypted fashion, for example, in its executable code or in an element separate from its executable code to facilitate its protection and its use.

Figure 1:
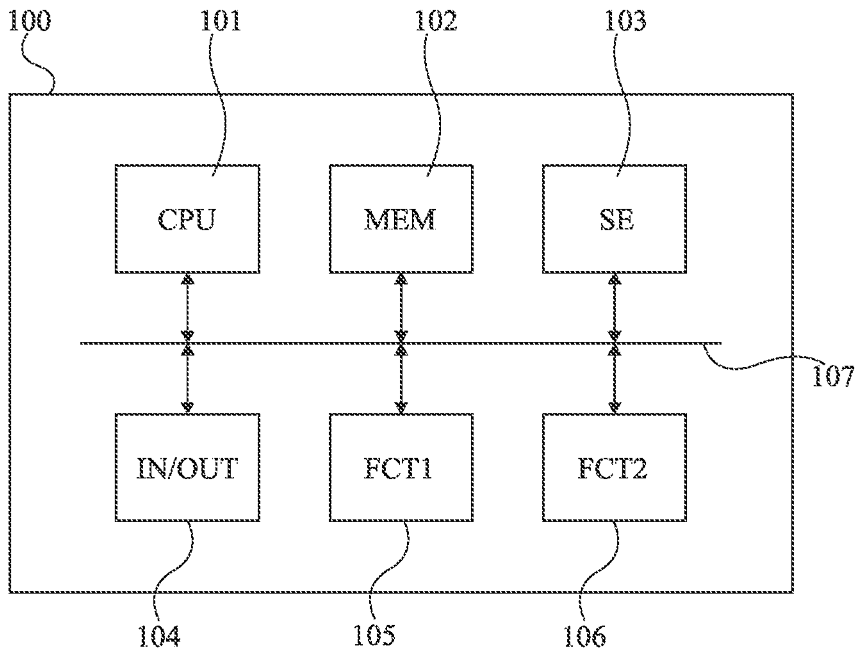
FIG. 1 very schematically shows in the form of blocks an example of an electronic device to which the embodiments of FIGS. 2 to 4 may apply.
Figure 2:
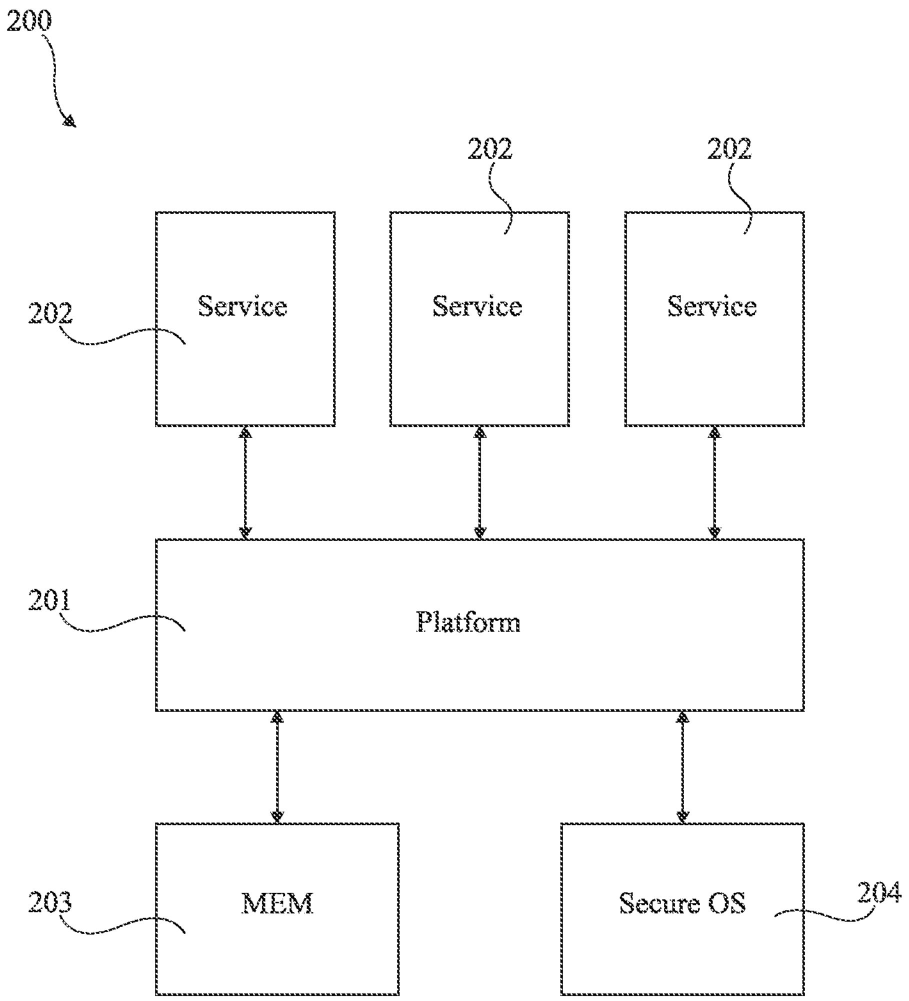
FIG. 2 very schematically shows in the form of blocks an embodiment of an electronic system.
Figure 3:
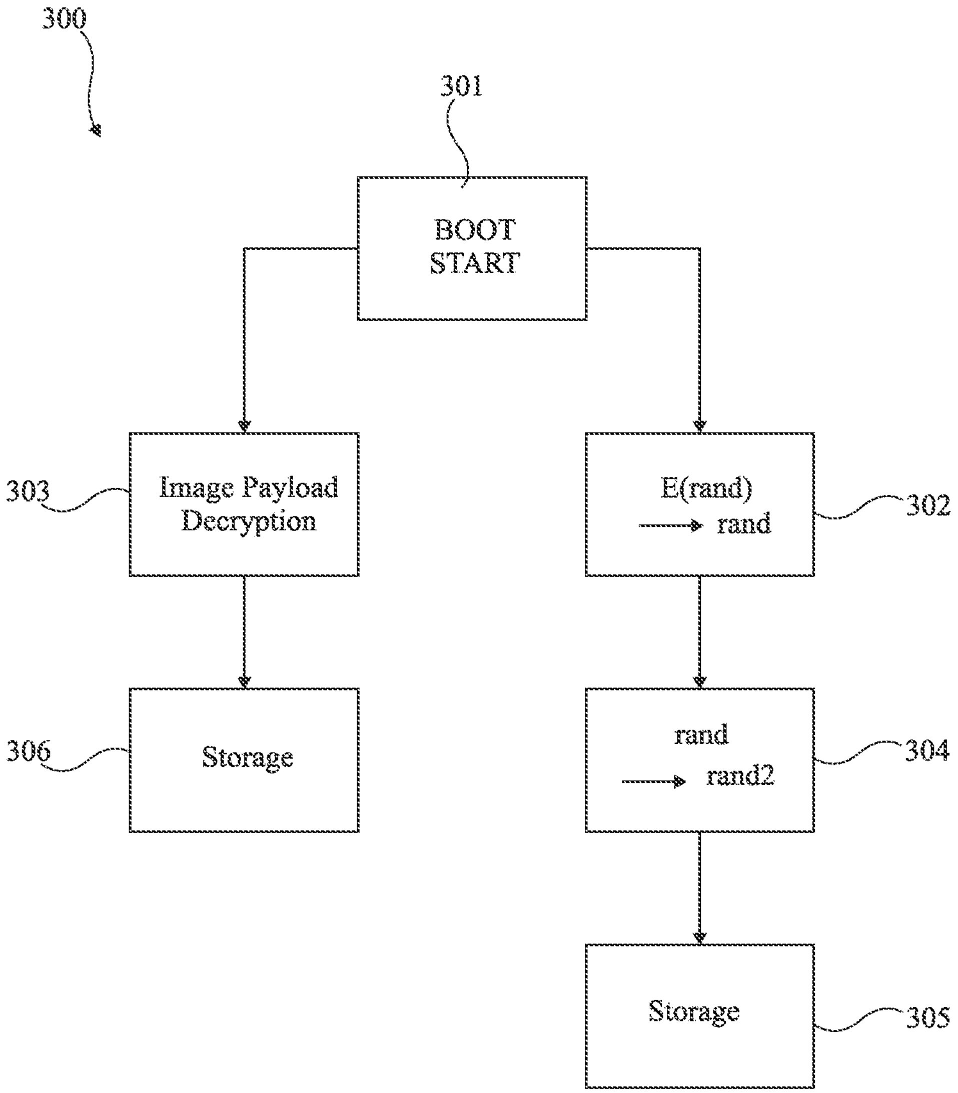
FIG. 3 shows a block diagram illustrating an implementation mode of a method of booting the system of FIG. 2.
Figure 4:
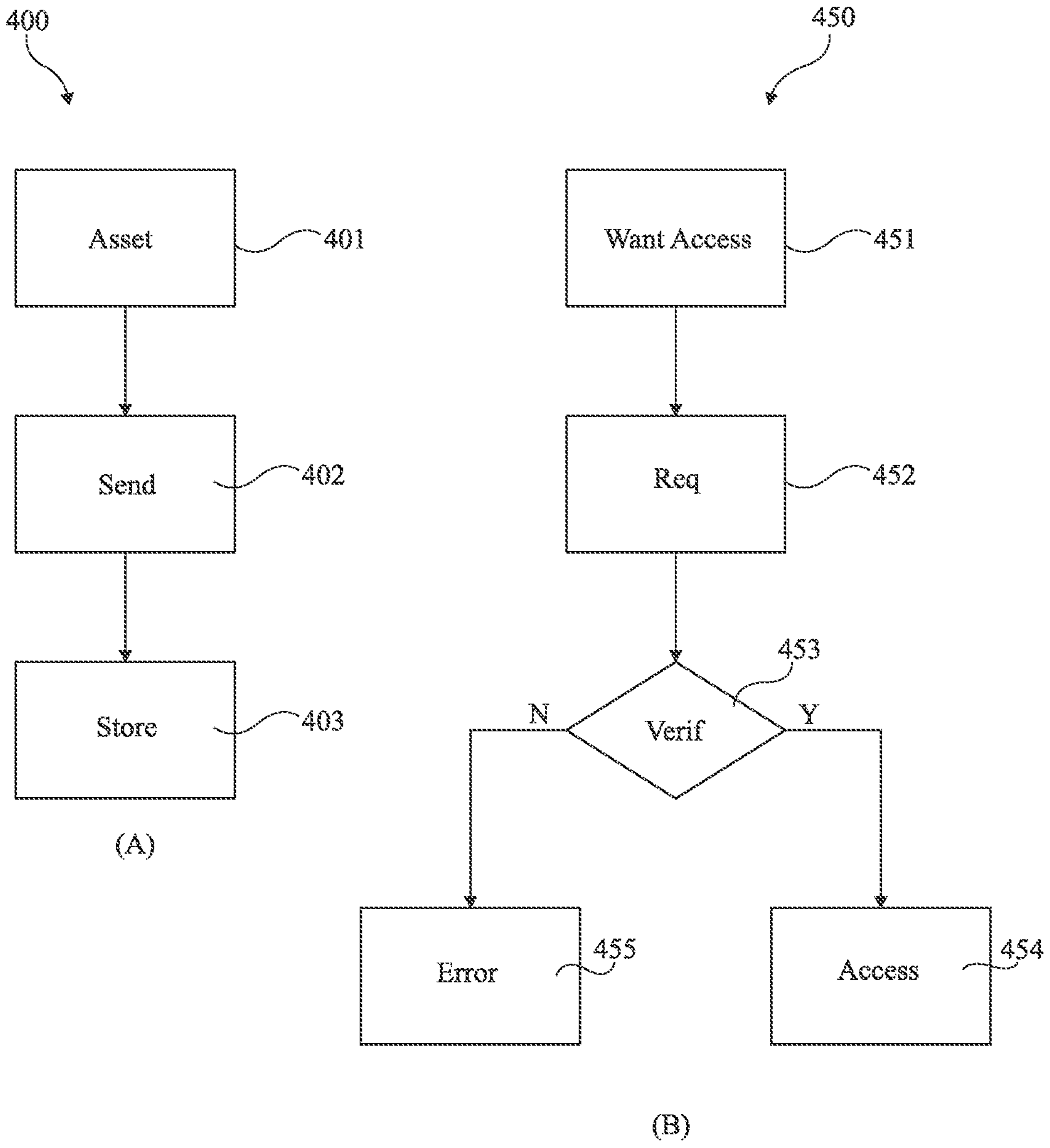
FIG. 4 shows a first block diagram illustrating an implementation mode of a method of storage of a digital asset, and a second block diagram illustrating an implementation mode of a method of recovery of a digital asset.

FIG. 1 is a block diagram very schematically showing an architecture of an example of an electronic device 100 configured to implement the embodiments described in relation with FIGS. 2 to 4.

Electronic device 100 comprises a processor 101 (CPU) configured to implement different data processing operations with respect to data stored in memories and/or supplied by other circuits of device 100. Processor 101 may further be configured to implement a software architecture of the type of the software architecture described in relation with FIG. 2.

Electronic device 100 further comprises different types of memories 102 (MEM), among which, for example, a non-volatile memory, a volatile memory, and/or a ROM. Each memory 102 may be configured to store different types of data, and may comprise access rules. In particular, memory or memories 102 may comprise portions which are only accessible to one or a plurality of circuits of the electronic device, and/or to one or a plurality of software programs implemented by device 100.

Electronic device 100 further comprises, for example, a secure element 103 (SE) configured to process critical and/or secret data. Secure element 103 may comprise its own processor(s), its own memory or memories, etc. Secure element 103 may further be configured to implement a software architecture of the type of the software architecture described in relation with FIG. 2.

What is referred to, in the rest of the disclosure, as critical data and secret data, means data having a content which is not intended to be public, and, thus, the access to which is restricted to certain specific persons and/or circuits.

Electronic device 100 may further comprise interface circuits 104 (IN/OUT) configured to send data to the outside of device 100 and/or to receive data originating from the outside of device 100. Interface circuits 104 may further be configured to implement a data display system, for example, a screen.

Electronic device 100 further comprises different circuits 105 (FCT1) and 106 (FCT2) configured to carry out different functions. As an example, circuits 105 may comprise measurement circuits, data conversion circuits, circuits for controlling electrical or electromechanical equipment, etc.

Electronic device 100 further comprises one or a plurality of data buses 107 configured to transfer data between its different components.

FIG. 2 very schematically shows in the form of blocks an embodiment of a software architecture, or software system 200.

Architecture, or system, 200 comprises: a shared and secure software platform 201 (Platform); one or a plurality of secure software applications 202 (Service); one or a plurality of memories 203 (MEM); and at least one secure operating system 204 (Secure OS).

Shared software platform 201 is software used to implement application(s) 202. More particularly, platform 201 is configured to communicate with the applications, and, more particularly, to receive data therefrom and transmit data thereto. According to an embodiment, platform 201 is configured to manage the storage of the data used by software application(s) 202. According to an example, software platform 201 is designed by a different original equipment manufacturer (OEM), or manufacturer, than the electronic device, such as the processor or the secure element, implementing it.

What is referred to herein as an original equipment manufacturer, or simply manufacturer, means the initial designer of an element, such as a circuit, a device, or software.

Secure software applications 202 (Service) are secure software configured to implement one or a plurality of functionalities. An application 202 may also be referred to as a software service, or simply service. According to an embodiment, an application 202 is implemented based on its executable code, and may use digital assets (Assets).

What is referred to here as an executable code means the set of data and instructions forming the program(s) implemented by an application. When an application is updated, its executable code is modified. Without an executable code, an application 202 cannot operate.

Further, what is referred to here as a digital asset means one or a plurality of data used during and by an application for its operation. These data may be collected, generated, and/or processed by said application. A digital asset may be a data element temporarily stored by the application, or more durably stored by the application. An application 202 does not necessarily need a digital asset to operate. When an application is updated, the digital assets are not modified. A digital asset is generally considered as a critical and/or secret data element.

According to an embodiment, each software application 202 may be designed by a manufacturer different from the manufacturer of software platform 201 and from the manufacturer of the electronic device, such as the processor or the secure element implementing them. Similarly, different applications may have different manufacturers.

Each application 202 is configured to communicate with platform 201 and, more generally, is configured to be implemented or executed by platform 201.

Memory or memories 203 represent the accesses to the different memory or memories of the device implementing system 200. Among these memories, there exists at least a portion of a memory having its access strictly reserved to platform 201, and at least a portion of a memory used for the storage of the digital assets of applications 202. Platform 201 is configured to manage memory accesses. Applications 202 do not have directly access to memories 203.

Secure operating system 204 is, for example, the operating system of the electronic device, such as a processor or a secure element, implementing system 200. Operating system 204 is configured to communicate with platform 201, but also, according to an example not shown, with memories 203 and applications 202.

According to an embodiment, each application 202 is configured to be identified by platform 201 via a random number Rand. This random number Rand is stored in encrypted fashion in, for example, the executable code of each application, or in an element separated from its executable code to facilitate its protection and its use. According to an example, this random number Rand is generated by the manufacturer of application 202. The use of this random number is described in relation with the implementation modes of the methods described in relation with FIGS. 3 and 4.

FIG. 3 is a block diagram illustrating an implementation mode of a method 300 for booting an electronic device of the type of the electronic device 100 described in relation with FIG. 1 implementing a system, or architecture, of the type of the system 200 described in relation with FIG. 2.

Initialization method 300, or boot method, is the method for booting the device and the system. This method is necessarily implemented before any implementation of an application of the system.

At a step 301 (BOOT START), the device and the system start. Each application presents its executable code to the shared software platform. According to an embodiment, the executable code of each application is encrypted. Step 301 is followed by two steps 302 (E(rand)→ rand) and 303 (Image Payload Decryption).

At step 302, the random number Rand enabling to identify the application is extracted from the executable code of the application by the platform. According to an embodiment, random number Rand is encrypted like the executable code of the application. The platform is configured to decrypt the random number.

At a step 304 (rand→rand2), successive to step 302, the platform may, according to an example, apply a derivation function to the random number Rand obtained at step 303. According to an example, the derivation function is a function configured to supply a new secret data element based on a first secret data element, such as a new random number based on a first random number. According to an example, the derivation function is a pseudo-random function. The platform thus supplies a derived random number Rand2 based on the previously-obtained decrypted random number Rand. In practice, each electronic device implementing boot method 300 comprises a derivation function configured to supply a random number different from the random numbers supplied by derivation functions of other devices. Thus, according to an example, the derivation function is a physically unclonable function (PUF).

At a step 305 (Storage), successive to step 304, the platform stores the derived random number Rand2 in a portion of a memory of the device which is only accessible to the platform. This derived random number Rand2 is used to verify the matching between a random number extracted from the executable code of a first application and that of a second application having already been received by the platform. An advantage of using a random number is that it forms a data element having a quasi-unique value and which is difficult to trace back by an encryption process or function.

Random number Rand is only known by the device implementing method 300, and is never stored in decrypted form during the implementation of steps 301 to 304. Derived random number Rand2 may be shared with other devices, for example directly or in encrypted fashion.

At step 303, successive to step 301, the encrypted executable code of the application is decrypted and/or authenticated. According to an embodiment, the executable code is decrypted, by the platform, by using a decryption key which is only known by the manufacturers of the application and of the platform, or of the device implementing the platform. In particular, the decryption key is not known by other manufacturers of applications.

At a step 306 (Storage), the decrypted executable code of the application is stored, by the platform, in a portion of a memory which is only accessible to the manufacturers of the application and of the platform, or of the device implementing the platform. In particular, the memory portion is not known by other manufacturers of applications.

Steps 302 to 306 are implemented for each application comprised in the system.

FIG. 4 comprises two block diagrams (A) and (B) illustrating implementation modes of a digital asset storage method 400 and of a digital asset recovery method 450. These methods are configured to be implemented by an electronic device of the type of the electronic device 100 described in relation with FIG. 1 implementing a system of the type of the system 200 described in relation with FIG. 2.

Methods 400 and 450 are necessarily implemented after the implementation of the method 300 described in relation with FIG. 3. Thus, the random numbers of identification of each application of the system have already been derived and stored by the shared software platform. In other words, the derived random number Rand2 of FIG. 3 has already been stored by the shared software platform, for example in a volatile memory by a step of the type of the step 305 described in relation with FIG. 3. According to an alternative embodiment, the derived random number Rand2 of FIG. 3 may be stored in a non-volatile memory, which has the advantage of gaining time at each starting and of avoiding a decryption operation which may be time-consuming.

At a step 401 (Asset), an application of the type of one of the applications 202 described in relation with FIG. 2 wants to store in the memory digital assets. According to an example, the concerned digital assets are critical and/or secret data supplied to the application by an external device or function, or critical and/or secret data generated by the application.

At a step 402 (Send), successive to step 401, the application sends the digital assets to be stored to the platform. According to an example, the platform may encrypt the digital assets by using the derived random number associated with the application as an encryption key. According to another example, the platform may sign the digital assets by using the derived random number.

At a step 403 (Store), successive to step 402, the platform stores the digital assets in a portion of a memory associated with the derived random number, that is, the random number Rand2 of FIG. 3. According to an example, said memory portion is only accessible to the shared software platform. According to a variant, said memory portion is only accessible to the shared software platform and to the manufacturer of said application.

At a step 451 (Want Access), an application of the type of one of the applications 202 described in relation with FIG. 2 wants to access the digital assets stored in the memory, for example to be able to implement some of its functionalities.

At a step 452 (Req), successive to step 451, the application sends a request to the shared software platform, indicating that it wants to recover the digital assets associated with its random number.

At a step 453 (Verif), successive to step 452, the platform verifies the matching between the derived random number of the application having made the request and the derived random numbers that it has stored in a memory portion. For this purpose, the platform uses the derived random number of said application, of the type of the random number rand2 of FIG. 3. According to a first example, the derived random number may be simply compared with all the derived random numbers stored by the platform. According to a second example, the received derived random number may be compared with the random number associated with the digital assets and/or with the memory portion storing digital assets to which application requests to access. According to a third example, if the derived random number is used to sign or to encrypt digital assets, then the received random number is used to verify whether it is effectively that which has been used to sign or encrypt the digital assets. Two of the three or the three previously-mentioned examples may be implemented successively or simultaneously to step 453. If step 453 results in a success (output Y of step 453), a step 454 (Access) is implemented, otherwise (output N of step 453), a step 455 (Error) is implemented.

At step 454, the platform has found digital assets associated with the random number of said application. The platform supplies these assets to the application.

At step 455, the platform has found no digital asset associated with the random number of said application. The platform thus supplies no asset to the application. According to an example, the platform may supply an error data element to the application.

According to an example, an application may change random number during an update of its executable code. This enables the platform not to supply a digital asset stored by a previous version of an application to a new version of this application. According to a specific example, this enables the platform to thwart an attack by application substitution.

Further, according to an example, if a platform detects that an application associated with a first random number has changed random number for a second random number, a possibility of suppressing the stored digital assets may be envisaged. Similarly, according to an example, if a platform detects that an application associated with a first random number has changed random number for a second random number, the new version of the application may be uninstalled and an old version, more secure, may be reinstalled.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

The invention claimed is:

1. A system, comprising:
- a first application; and
- a shared software platform;
- wherein said first application is identified by said shared software platform using a first random number and a second number;
- wherein said first random number is stored in encrypted fashion in an executable code of said first application; and
- wherein said second number is a number derived by the shared software platform from the first random number during boot of the system by extracting the first random number from the executable code, decrypting the extracted first random number, and applying a derivation function to the decrypted first random number, such that the second number is representative of the first random number, and is stored in a first portion of a memory only accessible to said shared software platform.

2. The system according to claim 1, wherein said first random number is generated by a first original equipment manufacturer of said first application.

3. The system according to claim 2, wherein said executable code of said first application is stored in a second portion of the memory which is not accessible to a second original equipment manufacturer of a second application implemented by said shared software platform.

4. The system according to claim 1, wherein said first random number is modified during an update of said first application.

5. The system according to claim 1, wherein said system is a secure operating system embedded in a secure element.

6. A method of booting a system, wherein the system comprises: a first application; and a shared software platform; wherein said first application is identified by said shared software platform using a first random number and a second number; the method comprising:
- sending, by said first application, an encrypted executable code to said shared software platform;
- extracting, by said shared software platform, the first random number from storage in encrypted fashion in an executable code of said first application;
- generating, by said shared software platform, the second number which is a number derived from the first random number during boot of the system by extracting the first random number from the executable code, decrypting the extracted first random number, and applying a derivation function to the decrypted first random number, such that the second number is representative of the first random number; and
- storing said second number in a first portion of a memory only accessible to said shared software platform.

7. The method according to claim 6, further comprising the following successive steps:
- decrypting, by said shared software platform, of said encrypted executable code with a first decryption key; and
- storing said decrypted executable code.

8. The method according to claim 7, further comprising:

modifying said first random number during an update of said first application; and storing said decrypted executable code in a second memory portion.

9. The method according to claim 8, wherein said first random number is generated by a first original equipment manufacturer of said first application; and wherein said first decryption key is not known by a second original equipment manufacturer of a second application implemented by said shared software platform.

10. A method of storing at least one first digital asset of a first application of a system, wherein the system comprises: a first application; and a shared software platform; wherein said first application is identified by said shared software platform using a first random number and a second number; wherein the method comprises:

deriving a second number derived by the shared software platform from the first random number during boot of the system by extracting the first random number from the executable code, decrypting the extracted first random number, and applying a derivation function to the decrypted first random number, such that the second number is representative of the first random number;

storing by said shared software platform of said at least one first digital asset; and associating the at least one first digital asset with said second number.

11. The method according to claim 10, further comprising using, by the shared software platform, said second number to sign said at least one first digital asset.

12. The method according to claim 10, further comprising using, by the shared software platform, said second number to encrypt said at least one first digital asset.

13. The method according to claim 10, further comprising storing said at least one first digital asset in a portion of a memory.

* * * * *